Patented Dec. 21, 1926.

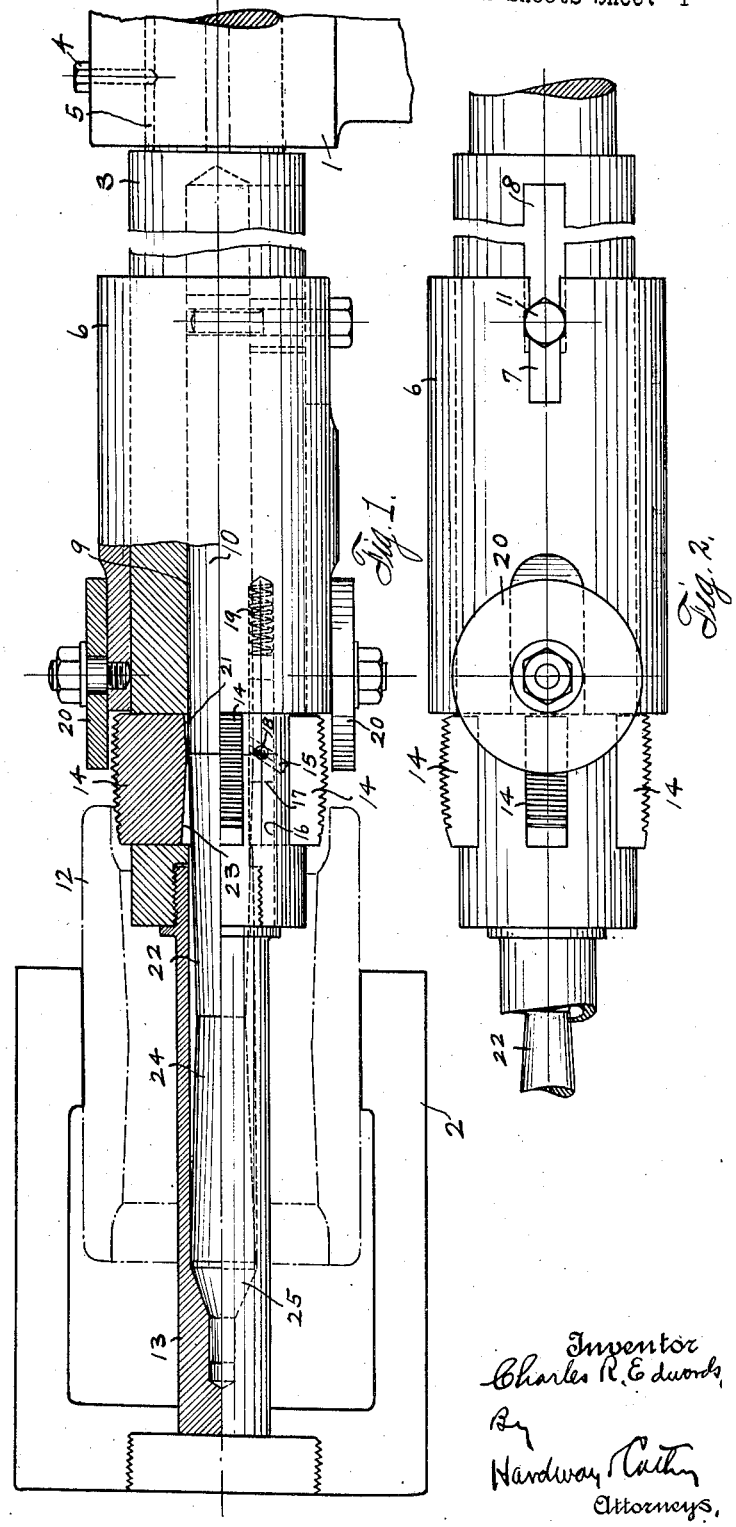

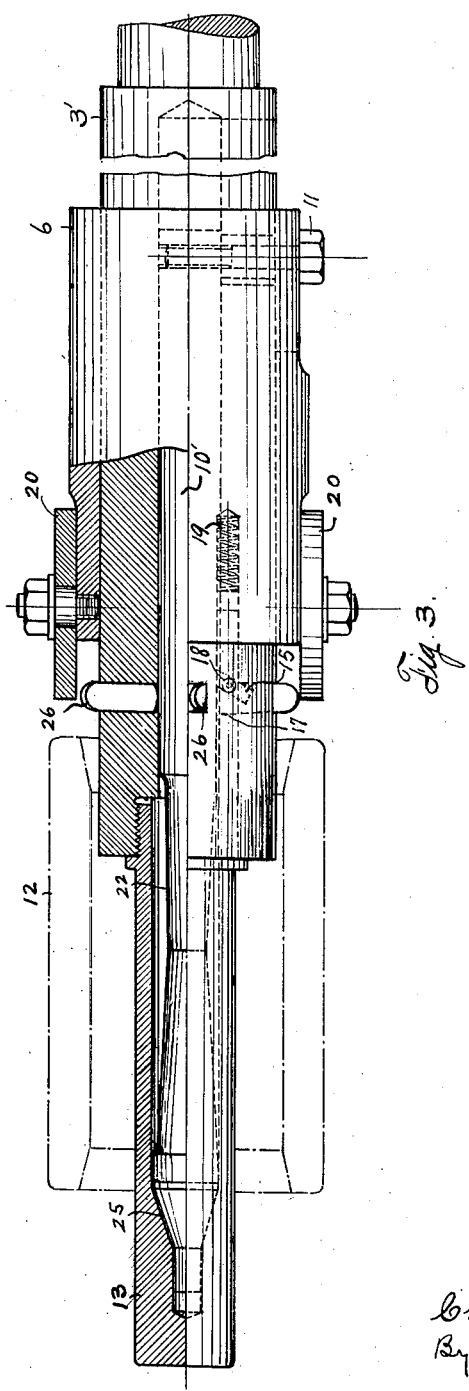

1,611,516

UNITED STATES PATENT OFFICE.

CHARLES R. EDWARDS, OF HOUSTON, TEXAS, ASSIGNOR TO WOODS, JOHN & COX, OF HOUSTON, TEXAS.

REAMING AND THREADING MACHINE.

Application filed January 17, 1921. Serial No. 437,971.

This invention relates to new and useful improvements in a reaming and threading machine.

One object of the invention is to provide a machine of the character described which may be used for reaming out and threading pipe couplings which have a double taper, that is, which are flared outwardly each way from the center to receive the ends of pipe joints to be connected thereby.

The invention herein described and claimed embodies a collapsible taper cutting tool embodying radially movable cutters, and means for releasing the cutters from the work, upon completion of the cutting operation so that the tool may be withdrawn from within and without the work, with the cutters out of contact with the work.

Another object of the invention is to provide a device of this character whereby the coupling may be either reamed or threaded at a single operation thus accomplishing, by easy operation, work which at the present time is difficult to perform.

With the above and other objects in view the invention has particular relation to certain novel features of construction, operation and arrangement of parts, an example of which is given in this specification and illustrated in the accompanying drawings, wherein:—

Figure 1 is a side view of the form of device used for tapping out the coupling, shown partially in section.

Figure 2 is a fragmentary bottom view thereof, and

Figure 3 is a side view, shown partially in section, of the form of device when used for reaming the coupling preparatory to threading the same.

Referring now more particularly to the drawings, the numeral 1 designates the lathe turret and the numeral 2 designates the lathe chuck. These parts are of the conventional form now forming part of the ordinary lathe. The numeral 3 designates the body of the device which is mounted in the turret 1 and is held against rotation thereby by means of a set bolt 4 whose inner end projects into a key-way 5, in said body. The numeral 6 refers to a sleeve which is slidably mounted on said body and whose underside has the deep notch 7 at its turret end, said notch being in alignment with a slot 8 cut through the body 3. The body 3 has a deep bearing 9 extending from the free end thereof back almost to the turret in which is seated the profile bar 10 which projects out beyond said body. A set bolt 11 passes through the notch 7 and the slot 8 and is threaded into said profile bar and operates to hold said sleeve and body against turning relative to said bar, but permits the body to move lengthwise relative to said sleeve and bar. The numeral 12 designates the coupling to be tapped. This coupling has been previously reamed out to give it the required inside contour, as shown, and it is held in the chuck 2 in the usual way and rotated thereby. The outer end of the profile bar is enclosed within a pilot 13, one end of which is threaded into the free end of the body 3 and the other end of which slides through a suitable bearing into which the chuck is formed. The free end of the body has oblong radial slots therethrough forming bearings in which the chasers 14 slide. One side of each chaser has an angularly disposed groove 15 therein forming a bearing and adjacent each chaser the body 3 has a lengthwise bearing 16 in which a plunger 17 operates. Each plunger has a laterally extending stud 18 which projects into the groove 15 and seated within the bearing 16 there is a coil spring 19 which operates against said plunger, thus holding the stud 18 against the inclined face of the groove 15 which in turn operates to hold the chasers closely against the profile bar. Rotatably mounted upon the sleeve are the oppositely disposed disc-like rollers 20.

In operation the body 3 is moved by the lathe toward the work until the rollers 20 contact against the opposing end of the coupling and the sleeve 6 is thereby held stationary while the body 3 and pilot 13 move on through the chuck until the end of the work is reached. The body is held by the lathe against rotation while the coupling is rotated by the chuck, as above explained. The chasers 14 operate to form interior threads in the coupling. While the first half of the coupling is being threaded the rearwardly inclined face 21 of each chaser rides down the tapering face 22 of the profile bar until the center of the coupling is reached and thereafter the forwardly inclined face 23 of said chaser rides up the tapering face 24 of the profile bar, finishing the work and thus giving a double taper to the coupling.

When the work is finished the chasers ride down the conical-shaped free end of the profile bar under the actuation of the springs 19 and are thus contracted or drawn together so that the device may be readily withdrawn back through the coupling to original position and in readiness to resume the work of tapping another coupling. In this connection it is to be observed that the operative end of the profile bar has a double taper corresponding in contour to the inside taper of the coupling to be tapped.

The general operation of the reaming device is the same as that of the threading or tapping device. This reaming device is illustrated in Figure 3 and the body thereof is designated by the numeral 3'. The profile bar 10' is of the same general contour as that of the profile bar 10 and its outer or operative end is enclosed by the pilot 13 and has the profile of the desired inside contour of the coupling 12. In the reaming device the reaming cutters 26 are substituted for the chasers 14 and work through radial slots in the body 3' and their inner ends are held against the profile bar by means of the springs 19 which work against the plunger 17, these plungers having the laterally extending studs 18 which work in the inclined bearings 15 of the respective cutters. The operative end of the profile bar has the contour of the desired interior contour of the coupling and the cutters, following said contour of the profile bar, ream out the coupling and give it a corresponding contour.

As above explained the body of the device is moved toward the work by the lathe until the rollers 20 contact against the opposing end of the coupling and the sleeve 6 is thereby held stationary while the body 3 and the pilot 13 move on through the chuck until the end of the work is reached and the cutters then follow the tapering end 25 of the contour bar and are retracted or withdrawn inwardly to permit the entire device to be pulled backwardly into original position through the coupling.

What I claim is:—

1. A device of the character described including a body, radially movable cutters mounted therein, a profile bar having a double taper mounted slidably in said body, resilient members operating against said cutters and normally holding them against said bar, a sleeve fitted over the body and having a limited longitudinal movement relative thereto, and bearing members carried by the sleeve for abutting the work.

2. A device of the character described including a body, a profile bar having a double taper slidably mounted therein and having a limited lengthwise movement relative thereto, a slidable sleeve on the body, a bearing carried by the sleeve for abutting the work, radially movable cutting members mounted in said body and held yieldingly against said bar, said members being actuated by said bar as the same is moved lengthwise in said body, said cutting members having angularly bearing faces which alternatively ride on said bar.

3. A device of the character described including a body, a profile bar having a bearing in said body and formed with a double taper, and one end of which projects therefrom, a sleeve-like pilot secured to said body and working over the free end of said bar, radially movable cutters carried by said body and formed with angularly disposed faces which ride on said bar and means holding said cutters yieldingly against said bar.

4. A device of the character described including a body, a profile bar having a bearing in said body and one end of which projects therefrom, a sleeve-like pilot secured to said body and working over the projecting end of said bar, radially movable cutters mounted in said body and having angularly disposed bearing faces, yieldable means working against said cutters and normally holding them against said bar, a sleeve fitted over said body and having a limited lengthwise movement relative thereto and rollers carried by the sleeve.

5. A device for forming the interior contour of a coupling and including a body adapted to work through said coupling, a profile bar having a bearing in said body and one end of which projects therefrom, a sleeve-like pilot secured to said body and working over the projecting end of said bar, radially movable cutters mounted in said body and whose inner ends are held yieldingly against said bar, said cutters following the contour of the bar as the device works through the coupling to be operated on, a sleeve slidably mounted on said body and rollers which operate against the coupling to hold the profile bar stationary during the progress of the work.

6. A device of the character described including a body, a profile bar having a varying contour and a bearing in said body, and one end of which projects therefrom, a sleeve-like pilot secured to said body and working over the free end of said bar, radially movable cutters carried by said body and formed with angularly disposed bearing faces which alternatively bear against the bar, means holding said cutters against said bar, and means abutting the work for holding the profile bar stationary with respect to the work.

7. A device of the character described including a body, a profile bar having a bearing in said body and one end of which projects therefrom, a sleeve-like pilot secured to said body and working over the projecting end of said bar, radially movable cutters mounted in said body, means working against said cutters and normally holding them against said bar, a sleeve fitted over said body and having a limited lengthwise movement relative thereto and rollers carried by the sleeve for abutting the work.

8. A device for forming the interior contour of a coupling and including a body adapted to work through said coupling, a profile bar having a bearing in said body and one end of which projects therefrom, a sleeve-like pilot secured to said body and working over the projecting end of said bar, radially movable cutters mounted in said body and whose inner ends are held against said bar, said cutters following the contour of the bar as the device works through the coupling to be operated on, a sleeve slidably mounted on said body and rollers which operate against the coupling to hold the profile bar stationary during the progress of the work.

9. A collapsible taper cutting tool including a body, radially movable cutters mounted therein, a profile member axially movable relative to the work and having a double taper forming a bearing surface for, and working between, the cutters and controlling the diameter at which the cutters work, and an abutment adapted to limit the axial movement of said profile bar relative to the work, said bearing surface terminating with a reduced diameter to permit the cutters to clear the work for the removal of the tool through the work.

10. In a taper cutting tool for shaping internally a tubular member, a body, cutters mounted in the body, a profile member axially movable relative to the work, having a double taper and forming a bearing against which the cutters ride and whose terminal diameter is reduced so that the cutters may collapse to clear the work to permit the tool to be withdrawn through the work, and an abutment movable with the profile member and adapted to limit its axial movement.

In testimony whereof I have signed my name to this specification.

CHARLES R. EDWARDS.